United States Patent [19]

Beihoffer

[11] Patent Number: 4,829,675
[45] Date of Patent: May 16, 1989

[54] ELECTRICAL APPLIANCE AND HANDLE FOR SAME

[75] Inventor: Randall A. Beihoffer, Bloomington, Minn.

[73] Assignee: The Toro Company, Minneapolis, Minn.

[21] Appl. No.: 87,120

[22] Filed: Aug. 19, 1987

[51] Int. Cl.⁴ .............................................. B26B 7/00
[52] U.S. Cl. ...................................... 30/276; 403/311
[58] Field of Search ................ 30/296 R, 296 A, 276; 403/292, 309, 310, 311

[56] References Cited

U.S. PATENT DOCUMENTS

| | | |
|---|---|---|
| 3,431,235 | 9/1967 | Mattson et al. |
| 4,052,789 | 10/1977 | Ballas . |
| 4,284,287 | 8/1981 | Esposito . |
| 4,397,088 | 8/1983 | Hampel . |
| 4,463,498 | 8/1984 | Everts . |
| 4,505,040 | 3/1985 | Everts . |

OTHER PUBLICATIONS

Toro Trimmer 1010 Operator's Manual (Form No. 3311-733 Rev. E), Toro Trimmer 1010 Parts Catalog (Form No. 3312-150 Rev. B).

Primary Examiner—Frank T. Yost
Assistant Examiner—William Fridie, Jr.
Attorney, Agent, or Firm—R. Lawrence Buckley

[57] ABSTRACT

An electrical appliance (10) including a motor assembly (12) and a switch assembly (14). A handle assembly (16) spans between the motor and switch assemblies (12 and 14, respectively). Lower handle (16a) includes a free end (22a) and upper handle (16b) includes a free end (22b). The free ends (22) form notches (26) which receive a wire (18) conductively coupling motor assembly (12) to switch assembly (14). Notches (26) allow for a shorter length of wire (18) and prevent abrasion and excessive bending of wire (18) during packaging and shipment.

5 Claims, 3 Drawing Sheets

ELECTRICAL APPLIANCE AND HANDLE FOR SAME

TECHNICAL FIELD

This invention relates to outdoor power equipment such as flexible line grass trimmers or small snowthrowers. More particularly, this invention relates to a power equipment unit of the hand-held type having a handle assembly split in the middle to allow the handle assembly to be collapsed during shipment.

BACKGROUND OF THE INVENTION

Various outdoor power equipment units are known which are hand-held during use. Most of these units include a housing having some type of active power driven element. An upwardly extending handle assembly is secured to the housing. This handle assembly is long enough so that a standing operator who is holding the assembly can easily position the housing adjacent to or in contact with the ground. Examples of such units can include both snowthrowers and grass trimmers. For example, the Power Shovel, a small light-weight handheld snowthrower, along with the entire line of flexible grass trimmers, all marketed by The Toro Company, Minneapolis, Minn., fit this description.

The handle assembly in this type of unit normally comprises upper and lower handle tubes. These tubes are disconnected during shipment of the unit to save space. However, during operation of the unit the tubes must be rigidly secured together end-to-end to provide a handle assembly of sufficient length. The handle tubes are also normally hollow, having an open interior. When the power equipment unit is provided with an electrical drive motor, the power supply cord for the motor normally runs down the entire length of the handle assembly through the hollow handle tubes.

The present invention is particularly directed toward hand held electrical appliances of the type described above. Although there is a wide variety of such appliances, the following description will focus on flexible line trimmers for the sake of illustration. Those skilled in the art will recognize that the present invention is applicable to all such electrical appliances, however.

Electrical flexible line trimmers typically include a motor, at the lower housing end, and a switch at the upper end. Manufacturers of electrical trimmers normally prewire the trimmers at the factory by connecting the motor to the switch with an insulated wire. Prewiring is considered necessary because of the use of 110 volt AC power and because of the use of some metal components, e.g., the handle tubes. Since trimmers are prewired in this fashion, a loop of insulated wire bridges the free ends of the disassembled handle portions during shipment. For example, a disassembled prior art electrical trimmer is shown in FIG. 1. It should be noted that the handle portions may have the same nominal outside and inside diameters. However, the free end of one handle portion is reduced in outside diameter to slide within the free end of the other handle portion. The long loop of insulated wire spanning between the handle portions should also be noted. One reason for the extra long loop is to minimize abrasion of the wire insulation during shipment and handling. Abrasion is also minimized through the use of split bushings which cover the edges of the free ends of the tubes. These bushings are removed prior to assembly. Still referring to the prior art unit of FIG. 1, use of a long loop of wire also minimizes stress and strain in the wire, which prevents the insulation from cracking, particularly when subjected to extremely cold temperatures. The Toro Company, assignee herein, has conducted "drop tests" of disassembled trimmers at $-32°$ F., and has discovered that an additional 5 or 6 inches of wire was required.

The "loop" technique described above is problematical, however. For one thing, the extra wire (roughly 6 inches for some trimmers) is costly and this cost becomes significant when multiplied over thousands of units. Moreover, the extra long loop of wire can hinder assembly of the handle. To assemble the unit, the consumer arranges the upper and lower handle portions such that the free ends of same are adjacent and such that the handle portions are axially aligned. Then, the handle portions are slid into engagement and, typically, a threaded connector is used to lock the handle portions together. FIG. 2 illustrates the assembled state of the prior art unit of FIG. 1. The extra long loop of wire can potentially interfere with this assembly procedure. If the handle portions are carefully and properly slid together in a controlled fashion the insulated wire will simply coil or buckle within the handle to form one or more "S-loops" therein and the assembly procedure will proceed normally. However, if the consumer assembles the handle portions in a rough manner or inappropriately forces the extra wire into one or both of the handle portions, problems can result.

The present invention addresses the problems associated with split handle prewired electrical appliances. In particular, the invention is directed toward a two piece handle which accommodates prewiring but which eliminates the need for superfluous wire.

SUMMARY OF THE INVENTION

Accordingly, one embodiment of the invention is an electrical appliance including a motor assembly; a switch assembly; and a two-piece tubular handle suitable for spanning between the motor and switch assemblies. The handle includes a first elongate portion attached at one end to the motor assembly and a second elongate portion attached at one end to the switch assembly, wherein the free ends of the elongate handle portions can be slideably connected together. A wire conductively connects the motor assembly to the switch assembly and runs within the tubular handle, and notches are formed in the free ends of the handle portions, whereby the electrical appliance can be packaged and shipped with the elongate handle portions unassembled and substantially parallel and with the wire received by the notches.

The "notches" which receive the wire when the handle portions are disassembled are preferably approximately 1 inch long and preferably occupy approximately 110° to 180° of the free ends of the handle portions. Since a large loop of extra wire is not required, the length of wire is approximately equal to the distance between the motor and switch assemblies when the electrical appliance is assembled, and buckling of the wire within the handle is substantially eliminated.

Another embodiment of the invention is a handle assembly of the type described above suitable for use with an electrical appliance having a motor assembly and a switch assembly.

BRIEF DESCRIPTION OF THE DRAWINGS

The invention is further described with reference to the Drawings, wherein.

DETAILED DESCRIPTION OF THE INVENTION

Figure 1:
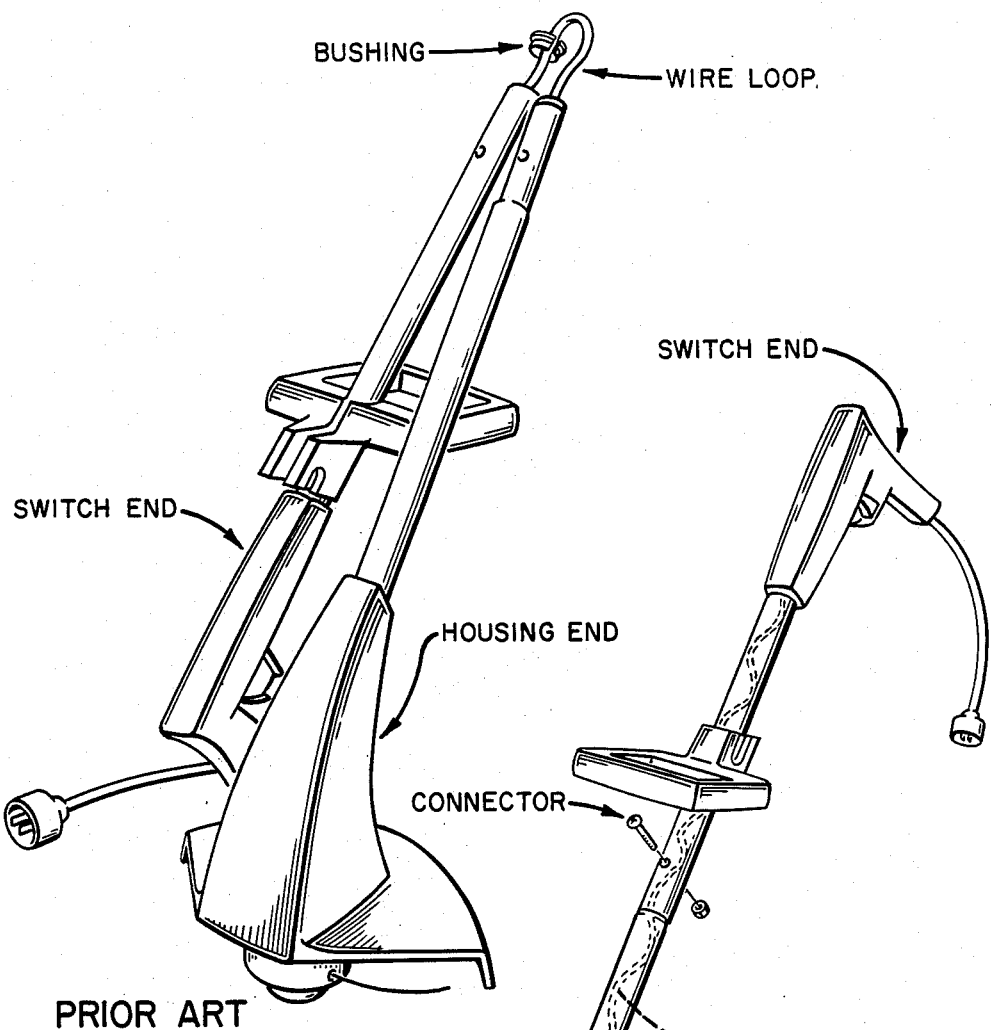
FIG. 1 is a perspective view of a prior art flexible line trimmer, in its disassembled state.
Figure 2:
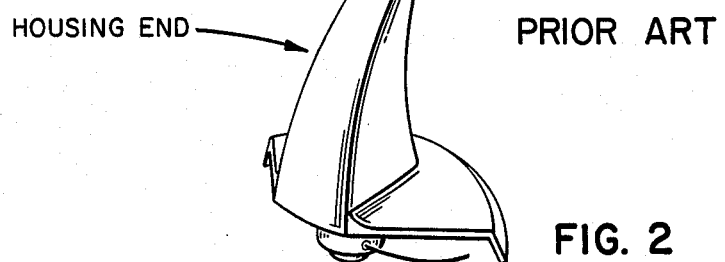
FIG. 2 is a perspective view of the prior art trimmer of FIG. 1, in its assembled state.
Figure 3:
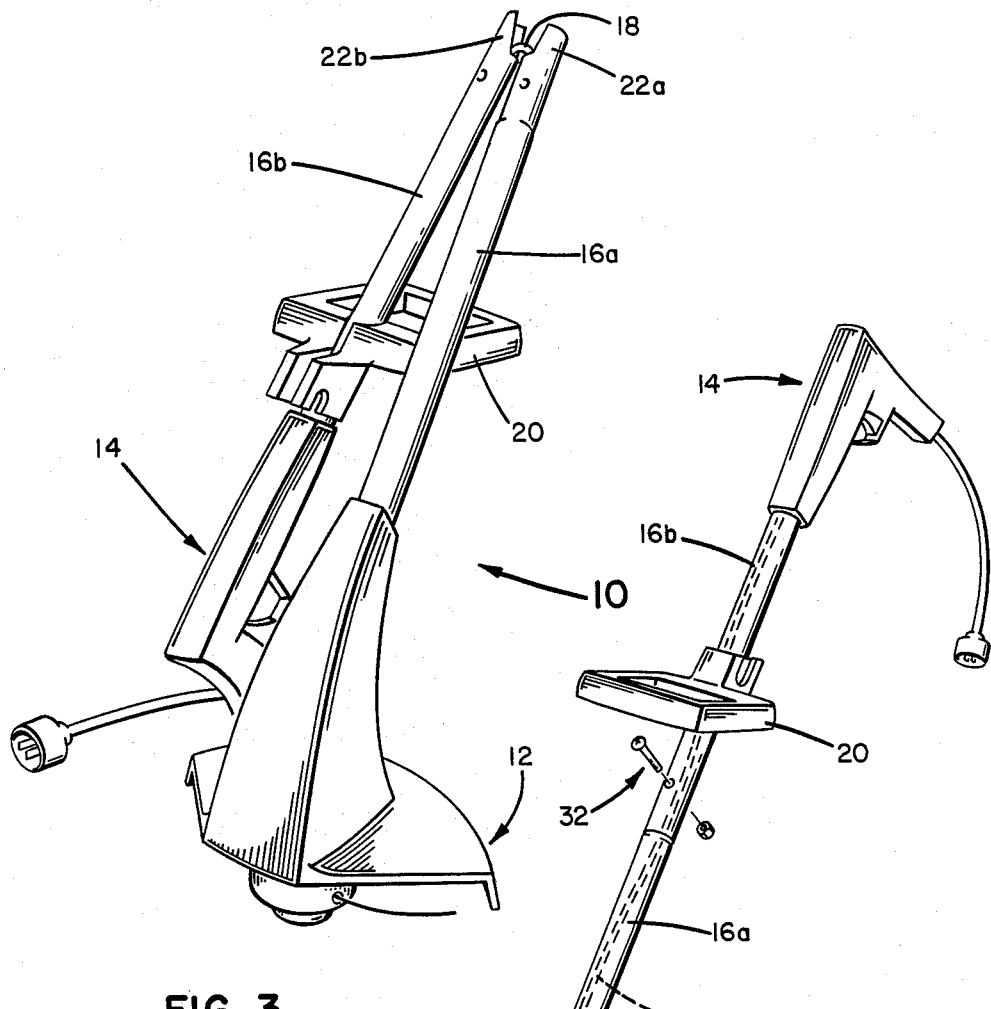
FIG. 3 is a perspective view of a flexible line trimmer according to the present invention, in its disassembled state.

With reference to the Drawings, wherein like reference numerals designate like parts and assemblies throughout the several views, FIG. 3 shows a perspective view of an appliance 10. In its preferred form, appliance 10 is an electrically-powered flexible line trimmer such as the type sold by The Toro Company, assignee herein. Reference is made to U.S. Pat. No. 4,052,789, issued to G. C. Ballas, incorporated herein by reference, which shows and describes such an electrical line trimmer. Trimmer 10 basically includes a motor assembly 12; a switch assembly 14; a tubular handle 16 suitable for spanning therebetween; and an insulated wire 18 running through handle 16 and interconnecting motor assembly 12 and switch assembly 14. Tubular handle 16 is typically made of 0.875 to 1.00 inch diameter, 0.035 inch wall thickness chromed tubular steel and consists of a lower portion 16a and an upper portion 16b. One end of lower portion 16a is attached to motor assembly 12. Similarly, one end of portion 16b is attached to switch assembly 14. A hand grip 20 clamps to handle 16 anywhere along its length, usually to upper portion 16b.

Figure 4A:
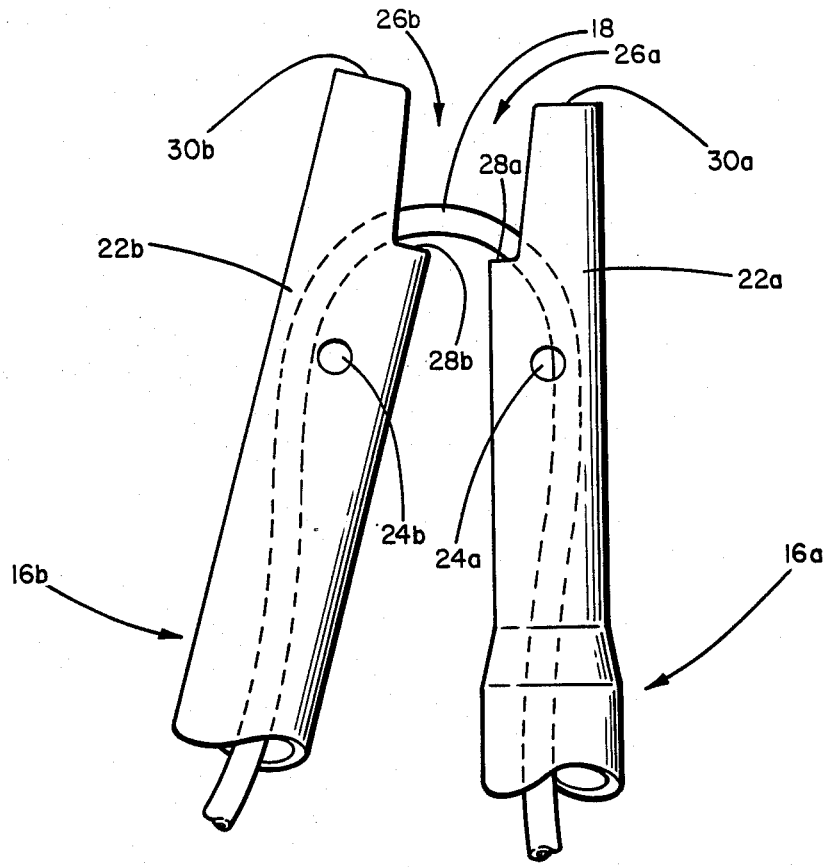
FIG. 4A is a side elevational view of the free ends of the handle portions of the electrical appliance shown in FIG. 3.

Free ends 22 of handle portions 16 are configured to slide together during assembly. Each free end 22 forms a thru hole 24, the function of which is described below. FIG. 4A is an elevational view of the free ends 22 of handle portions 16. As can be seen, the free end 22a of lower handle portion 16a is smaller in outside diameter and is thus configured to fit within the free end 22b of upper handle portion 16b. Preferably, the outside diameter of free end 22a is about 0.79 inch. On the other hand, the inside diameter of free end 22b measures approximately 0.8 inch. Thus it can be seen that the free end 22a of lower handle portion 16a can slide within the free end 22b of upper handle portion 16b. Apertures 24 formed by handle portions 16 are aligned following complete insertion of free end 22a into free end 22b.

Figure 4B:
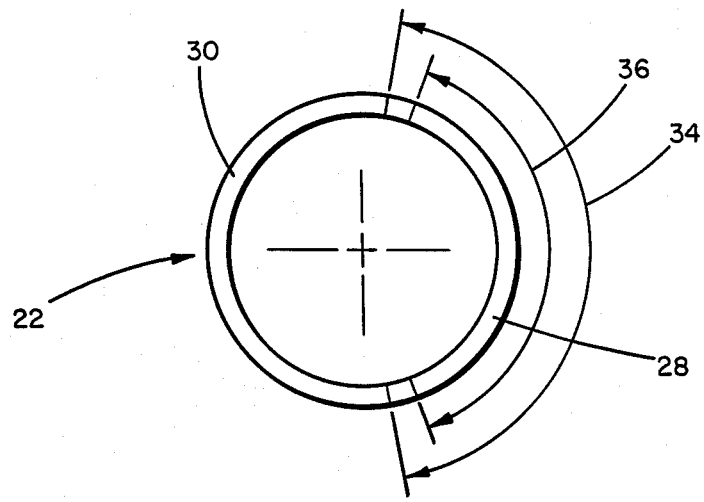
FIG. 4B is an end view of one of the handle free ends of the appliance shown in FIG. 3.

With reference to FIGS. 4A and 4B, free ends 22 of handle portions 16 form notches 26 suitable for receiving wire 18. Preferably, each notch 26 is about 1 inch long; occupies a circumferential angle 36 of about 110° to 145° at the notch base 28; and occupies an angle 34 of about 140° to 180° at the notch tip 30. Notches 26 are formed by placing a mandrel in the free end 22 of each tube 16 and shearing the tube using a second tool which fits within the female mandrel inserted within the tube. Those skilled in the art will recognize that other tube configurations and fabrication techniques are possible. For example, notches 26 could be narrower and longer than those shown and described herein. It is important only that the free ends 22 be sufficiently relieved to allow wire 18 to loop between handle portions 16 without bending the wire too severely; causing abrasion of the wire insulation; or adding unnecessary wire to appliance 10. During shipment, handle portions 16 are arranged so that notches 26 face one another which allows the minimum length of wire 18 and makes assembly of unit 10 easier. It should be noted that notches 26 provide additional protection for wire 18 from accidental drops of unit 10. Wire 18 is routed through notches 26 versus over the top of the tube ends as before.

Figure 5:
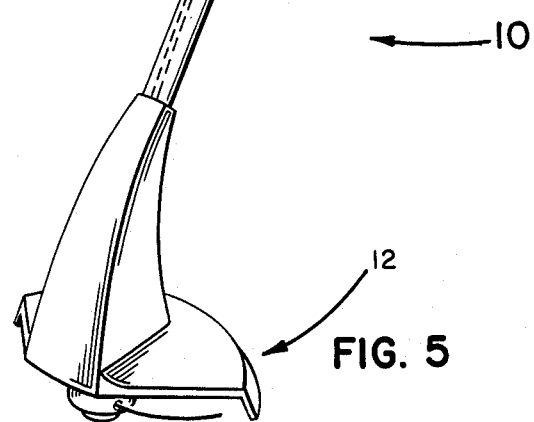
FIG. 5 is a perspective view of the electrical appliance of FIG. 3 in its assembled state.

To assemble upper and lower handle portions 16 it is simply necessary to remove and discard the shipping bushings (not shown) secured to free ends 22. Then, the exposed portion of wire 18 is inspected for damage or wear. Of course, if wire 18 is damaged in any way, the unit should not be assembled or used. Assuming that wire 18 is intact, handle portions 16 are axially aligned and free end 22a of lower handle portion 16a is slid into free end 22b of upper handle portion 16b until screw holes 24 are aligned. The angular alignment of switch assembly 14 and motor assembly 12 should be checked at this point to ensure that they are not misaligned by 180°. Since notches 26 are facing one another during shipment, and this corresponds to proper alignment of switch assembly 14 and motor assembly 12, it is difficult to misalign holes 24 by 180°, contrary to prior art designs. Referring to FIG. 5, when the switch and motor assemblies are properly positioned, and when screw holes 24 are aligned, a standard threaded connector 32 can be carefully inserted through the aligned holes 24 to secure handle portions 16 together. Care should be exercised to ensure that wire 18 is not blocking holes 24 and that fastener 32 can be freely inserted without contacting wire 18. In some prior art trimmers the excess wire tended to block the holes and had to be physically pushed aside prior to inserting the bolt.

FIG. 5 shows trimmer 10 in its assembled state. Wire 18 is shown in dashed line. It should be noted that the length of wire 18 is substantially equal to the distance between switch assembly 14 and motor assembly 12. That is, wire 18 needn't buckle within handle 16 when unit 10 is assembled. This is due to the use of notches 26: they permit the use of a sufficiently long loop of wire 18 to eliminate excessive stress on same while at the same time obviating the need for extra wire which would have to be somehow contained within tubular handle 16 following assembly.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

I claim:

1. An electrical appliance comprising:
   (a) a motor assembly;
   (b) a switch assembly;
   (c) a tubular handle suitable for spanning between the motor and switch assemblies, the handle comprising a first elongate portion attached at one end to the motor assembly and a second elongate portion attached at one end to the switch assembly, wherein the free ends of the elongate handle portions can be slideably connected together; and (d) a wire conductively connecting the motor assembly to the switch assembly and running within the tubular handle, wherein elongate notches for receiving the wire are formed immediately adjacent the free ends of the handle portions, each notch having an open notch tip located at the free end of the corresponding handle portion and a closed notch base axially spaced therefrom, wherein the handle portions of the electrical appliance can be configured for packaging and shipment such that they are parallel to one another, in which case the notches face one another and the notch bases are adjacent and the notch tips are adjacent, wherein the wire can be received by the notches to thereby eliminate damage to the wire caused by the free ends of the handle portions; and wherein the length of the wire is approximately equal to the distance between the motor assembly and the switch assembly when the electrical appliance is assembled, whereby buckling of the wire within the handle is substantially eliminated when the electrical appliance is assembled.

2. The appliance of claim 1, wherein the electrical appliance is a flexible line trimmer.

3. The appliance of claim 1, wherein the notches are approximately 1 inch long.

4. The appliance of claim 1, wherein the tubular handle is nominally circular and wherein the notches occupy about 110° to 180° of the free ends of the handle portions.

5. An electrical flexible line trimmer comprising:
(a) a motor assembly;
(b) a switch assembly;
(c) a tubular handle suitable for spanning between the motor and switch assemblies, the handle comprising a first elongate portion attached at one end to the motor assembly and a second elongate portion attached at one end to the switch assembly, wherein the free ends of the elongate handle portions can be slideably connected together; and
(d) a wire conductively connecting the motor assembly to the switch assembly and running within the tubular handle, wherein about 1 inch notches for receiving the wire are formed immediately adjacent the free ends of the handle portions, and the notches occupy about 110° to 180° of the free ends of the handle portions, each notch having an open notch tip located at the free end of the corresponding handle portion and a closed notch base axially spaced therefrom, wherein the handle portions of the electrical appliance can be configured for packaging and shipment such that they are parallel to one another, in which case the notches face one another and the notch bases are adjacent and the notch tips are adjacent, wherein the wire can be received by the notches to thereby eliminate damage to the wire caused by the free ends of the handle portions; and wherein the length of the wire is approximately equal to the distance between the motor and switch assemblies when the trimmer is assembled, thereby substantially eliminating buckling of the wire within the handle.

* * * * *